(12) United States Patent
Kim et al.

(10) Patent No.: US 11,837,008 B2
(45) Date of Patent: Dec. 5, 2023

(54) TOUCH SENSOR WITH FINGERPRINT SENSOR

(71) Applicants: SK Innovation Co., Ltd., Seoul (KR); Industry-Academic Cooperation Foundation, Yonsei University, Seoul (KR)

(72) Inventors: Jun Hyung Kim, Daejeon (KR); Sang Yoon Ji, Daejeon (KR); Jang-Ung Park, Seoul (KR)

(73) Assignees: SK Innovation Co., Ltd., Seoul (KR); Industry-Academic Cooperation Foundation, Yonsei University, Seoul (KR)

( * ) Notice: Subject to any disclaimer, the term of this patent is extended or adjusted under 35 U.S.C. 154(b) by 73 days.

(21) Appl. No.: 17/147,917

(22) Filed: Jan. 13, 2021

(65) Prior Publication Data

US 2021/0216737 A1 Jul. 15, 2021

(30) Foreign Application Priority Data

Jan. 14, 2020 (KR) .......................... 10-2020-0004844

(51) Int. Cl.
*G06V 40/13* (2022.01)
*G06F 3/044* (2006.01)

(52) U.S. Cl.
CPC ........ *G06V 40/1306* (2022.01); *G06F 3/0445* (2019.05)

(58) Field of Classification Search
CPC ............ G06V 40/1306; G06V 40/1318; G06F 3/0445; G06F 3/0446; G06F 3/04164
See application file for complete search history.

(56) References Cited

U.S. PATENT DOCUMENTS

| | | | |
|---|---|---|---|
| 9,329,742 B2 | 5/2016 | Yi et al. |
| 9,983,744 B2 | 5/2018 | Son |
| 10,002,278 B2 | 6/2018 | Song et al. |
| 10,360,427 B2 | 7/2019 | Lee et al. |
| 10,379,684 B2 | 8/2019 | Ahn et al. |
| 10,444,928 B2 | 10/2019 | Tanaka et al. |
| 10,467,449 B2 | 11/2019 | Jang et al. |
| 10,579,175 B2 | 3/2020 | Seol |
| 10,613,677 B2 | 4/2020 | Cho et al. |
| 10,627,938 B2 | 4/2020 | Lee et al. |

(Continued)

FOREIGN PATENT DOCUMENTS

KR 1020180127259 A 11/2018

*Primary Examiner* — Jonathan A Boyd
(74) *Attorney, Agent, or Firm* — The Webb Law Firm

(57) ABSTRACT

The present invention is to provide a touch sensor with a fingerprint sensor capable of making brightness uniform by removing a difference in brightness in a portion to which a touch sensor and the fingerprint sensor are applied, in which an output of a touch display device of uniform brightness may be obtained by applying dummy electrodes to a portion constituting the touch sensor to change a structure so that light transmittances of the fingerprint sensor and the touch sensor are the same as or similar to each other or controlling a portion at which the finger sensor is positioned in an entire region of a light emitting layer to be brighter than the rest portion by a control unit of touch display devices to which the fingerprint sensor according to various embodiments of the present invention is applied.

9 Claims, 9 Drawing Sheets

(56) References Cited

U.S. PATENT DOCUMENTS

| | | |
|---|---|---|
| 10,627,955 B2 | 4/2020 | Ko et al. |
| 10,691,231 B2 | 6/2020 | Han et al. |
| 10,705,663 B2 | 7/2020 | Ahn et al. |
| 10,839,187 B2 | 11/2020 | Kim |
| 10,915,194 B2 | 2/2021 | Zhu et al. |
| 10,929,634 B2 | 2/2021 | Jee et al. |
| 2012/0105081 A1* | 5/2012 | Shaikh ............ G06F 3/0445 29/829 |
| 2013/0321004 A1 | 12/2013 | Chen et al. |
| 2014/0152608 A1* | 6/2014 | Peng ............ G01D 5/2405 345/174 |
| 2016/0224818 A1 | 8/2016 | Song et al. |
| 2016/0232395 A1* | 8/2016 | Han ............ G06F 1/1626 |
| 2016/0364593 A1 | 12/2016 | Lee et al. |
| 2017/0010707 A1 | 1/2017 | Son |
| 2017/0031514 A1 | 2/2017 | Kimura et al. |
| 2017/0091508 A1 | 3/2017 | Han et al. |
| 2017/0220178 A1 | 8/2017 | Jian et al. |
| 2017/0293378 A1 | 10/2017 | Ahn et al. |
| 2018/0032206 A1 | 2/2018 | Lin et al. |
| 2018/0039349 A1 | 2/2018 | Han et al. |
| 2018/0059827 A1 | 3/2018 | Tanaka et al. |
| 2018/0068156 A1 | 3/2018 | Jang et al. |
| 2018/0113548 A1 | 4/2018 | Lee et al. |
| 2018/0113558 A1 | 4/2018 | Cho et al. |
| 2018/0181787 A1 | 6/2018 | Jee et al. |
| 2018/0307075 A1 | 10/2018 | Jeong et al. |
| 2018/0315799 A1 | 11/2018 | Jiang |
| 2018/0335880 A1 | 11/2018 | Seol |
| 2019/0018540 A1 | 1/2019 | Ko et al. |
| 2019/0025969 A1 | 1/2019 | Liu et al. |
| 2019/0114455 A1 | 4/2019 | Kim |
| 2019/0324576 A1 | 10/2019 | Ahn et al. |
| 2020/0019268 A1 | 1/2020 | Zhu et al. |
| 2020/0034595 A1 | 1/2020 | Jang et al. |
| 2020/0050360 A1 | 2/2020 | Jeon et al. |
| 2020/0174616 A1 | 6/2020 | Noguchi |
| 2020/0310573 A1 | 10/2020 | Hsu |
| 2020/0311367 A1 | 10/2020 | Hu |
| 2020/0327294 A1 | 10/2020 | Cheng |
| 2020/0327297 A1 | 10/2020 | An |
| 2021/0012080 A1 | 1/2021 | Fan |
| 2021/0064171 A1 | 3/2021 | Zhang et al. |
| 2021/0109635 A1 | 4/2021 | An |
| 2021/0201744 A1 | 7/2021 | Park et al. |
| 2021/0216736 A1 | 7/2021 | Kim et al. |
| 2021/0216737 A1 | 7/2021 | Kim et al. |

* cited by examiner

TOUCH SENSOR WITH FINGERPRINT SENSOR

CROSS-REFERENCE TO RELATED APPLICATION

This application claims priority to Korean Patent Application No. 10-2020-0004844 filed Jan. 14, 2020, the disclosure of which is hereby incorporated by reference in its entirety.

BACKGROUND OF THE INVENTION

Field of the Invention

The following disclosure relates to a touch sensor with a fingerprint sensor.

Description of Related Art

Recently, there is a tendency for screens of mobile devices to become large, and accordingly, the mobile devices have been developed in a manner of minimizing or removing physical buttons such as a home button. In accordance with such a tendency to remove the physical buttons, the development of a button integrated into a display has been accelerated. In addition, in accordance with a tendency for a button using a fingerprint to emerge, the development of a fingerprint sensor integrated with the display has been demanded.

The fingerprint sensor has generally used a capacitance manner, which may be mainly divided into a unit cell driving manner and a matrix driving manner. The unit cell driving manner is a manner of constituting a sensor recognizing a fingerprint using a plurality of unit cells that are individually driven, may use various materials such as indium tin oxide or silicon, has an advantage that noise is low, but has a disadvantage that transparency is deteriorated due to a complicated process and many layers, and thus, has a limitation in being applied to a transparent electrode.

The matrix driving manner is a manner of allowing an upper electrode extending along an x axis and a lower electrode extending along a y axis to be spaced apart from and intersect with each other to constitute an element in a line-by-line shape, has an advantage that an element structure is simple, the element is manufactured only by the upper electrode and the lower electrode, and a transmittance is high, but has a disadvantage that noise is large, such that the element needs to be driven at a high frequency of 10 kHz or more. The indium tin oxide mainly used for the transparent electrode has a high resistance value, such that there is a limitation that it is difficult to drive the element at a high frequency band of 10 kHz or more. In addition, flexibility of the indium tin oxide is insufficient, such that there is a limitation that it is difficult to apply the indium tin oxide to a stretchable display. Therefore, a transparent electrode having a high transmittance and a high electrical conductivity is required for the fingerprint sensor.

Korean Patent Laid-Open Publication No. 10-2018-0127259 (entitled "Transparent Electrode Structure for Fingerprint Sensor and Fingerprint Sensor Including the Same" and published on Nov. 28, 2018) (hereinafter, referred to as Related Art 1) discloses a transparent electrode for a fingerprint sensor according to the related art.

FIG. 1 is a cross-sectional view of a transparent electrode structure 1 for a fingerprint sensor disclosed in Related Art 1. Referring to FIG. 1, the transparent electrode structure 1 according to the related art may include a first electrode 11, a dielectric layer 13, a second electrode 12, and a cover 14 that are stacked in one direction.

FIG. 2 is a plan view of the transparent electrode structure 1 for a fingerprint sensor disclosed in Related Art 1. As illustrated in FIG. 2, the first electrode 11 includes first conductive lines 21 extending in a first direction, and the second electrode 12 includes second conductive lines 22 extending in a second direction. The reason why the transparent electrode structure 1 for a fingerprint sensor includes the first electrode 11 and the second electrode 12 each including conductive lines extending in different directions as such is to identify a user's fingerprint using a capacitance difference at portions where the conductive lines intersect with each other, and a density of the portions where the conductive lines intersect with each other is higher than a density of patterns included in a general touch sensor. Since the density of the patterns included in the touch sensor is lower than that of the transparent electrode structure 1 as described above, the touch sensor did not need to be configured so that the first electrode 11 and the second electrode 12 intersect with each other as in the transparent electrode structure 1, and has been generally configured using only an electrode formed of a single layer.

In order to use the transparent electrode structure 1 for a fingerprint sensor according to the related art illustrated in FIGS. 1 and 2 together with the general touch sensor on a display, a structure constituting the touch sensor and the transparent electrode structure 1 should be arranged together. However, there was a problem that a difference in an amount of transmitted light between the touch sensor formed of a single layer and the transparent electrode structure 1 formed of two different electrodes overlapping each other occurs, such that a portion where the transparent electrode structure 1 is positioned becomes dark.

RELATED ART DOCUMENT

[Patent Document]
Korean Patent Laid-Open Publication No. 10-2018-0127259 (entitled "Transparent Electrode Structure for Fingerprint Sensor and Fingerprint Sensor Including the Same" and published on Nov. 28, 2018)

SUMMARY OF THE INVENTION

An embodiment of the present invention is directed to providing a touch sensor with a fingerprint sensor capable of providing an output of uniform brightness of a display device as a whole by removing a difference in brightness in a portion to which the touch sensor and the fingerprint sensor are applied in the display device in which the touch sensor and the fingerprint sensor are applied together.

In one general aspect, a touch sensor with a fingerprint sensor includes: a lower electrode layer including a plurality of first touch sensor electrodes arranged two-dimensionally, first dummy electrodes, and one or more first fingerprint sensor electrodes; a dielectric layer formed on one surface of the lower electrode layer; and an upper electrode layer formed on one surface of the dielectric layer and including a plurality of second touch sensor electrodes arranged two-dimensionally, second dummy electrodes, and one or more second fingerprint sensor electrodes, wherein the first fingerprint sensor electrode and the second fingerprint sensor electrode are arranged at the same position so as to face each other to constitute the fingerprint sensor, and the first touch sensor electrode and the second dummy electrode are arranged at the same position so as to face each other, and the second touch sensor electrode and the first dummy electrode are arranged at the same position so as to face each other.

Light transmittances of a first touch sensor constituted by the first touch sensor electrode and the second dummy electrode, a second touch sensor constituted by the second touch sensor electrode and the first dummy electrode, and the fingerprint sensor may be the same as each other or have a difference within a predetermined range therebetween.

The first fingerprint sensor electrode may include a plurality of patterns formed to be spaced apart from each other in a first direction, and the second fingerprint sensor electrode may include a plurality of patterns formed to be spaced apart from each other in a second direction intersecting with the first direction at a predetermined angle.

An interval between the patterns adjacent to each other may be 0.1 to 30 μm.

A width of the pattern may be 0.1 to 100 μm.

The fingerprint sensor may be disposed at a vertex of an outer side of a touch display device.

The fingerprint sensor may be disposed to be spaced apart from an outer side of a touch display device inward by one or more first touch sensor electrodes or second touch sensor electrodes.

A first touch sensor constituted by the first touch sensor electrode and the second dummy electrode, a second touch sensor constituted by the second touch sensor electrode and the first dummy electrode, and the fingerprint sensor may have the same shape.

The first touch sensor electrodes and the first dummy electrodes may be alternately arranged.

A single first fingerprint sensor electrode may be disposed to substitute for any one of the first dummy electrodes.

The second touch sensor electrodes and the second dummy electrodes may be alternately arranged.

A single second fingerprint sensor electrode may be disposed to substitute for any one of the second dummy electrodes.

The lower electrode layer may include a first conductive line connecting between the first touch sensor electrodes adjacent to each other in a third direction, and the upper electrode layer may include a second conductive line connecting between the second touch sensor electrodes adjacent to each other in a fourth direction in a direction intersecting with the third direction.

The touch display device may further include: a base film formed on the other surface of the lower electrode layer; and a cover layer formed on one surface of the upper electrode layer.

DESCRIPTION OF THE INVENTION

Hereinafter, a touch sensor with a fingerprint sensor according to a preferred embodiment of the present invention will be described in detail with reference to the accompanying drawings.

First Embodiment

Figure 1:
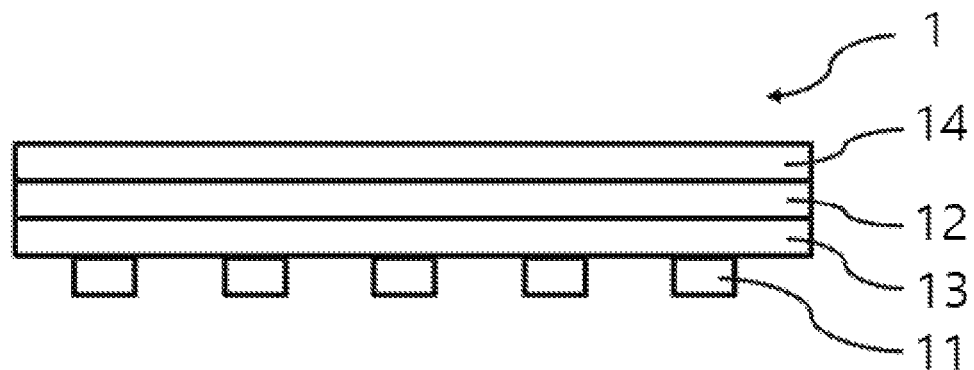
FIG. 1 is a cross-sectional view of a transparent electrode structure for a fingerprint sensor disclosed in Related Art 1.
Figure 2:
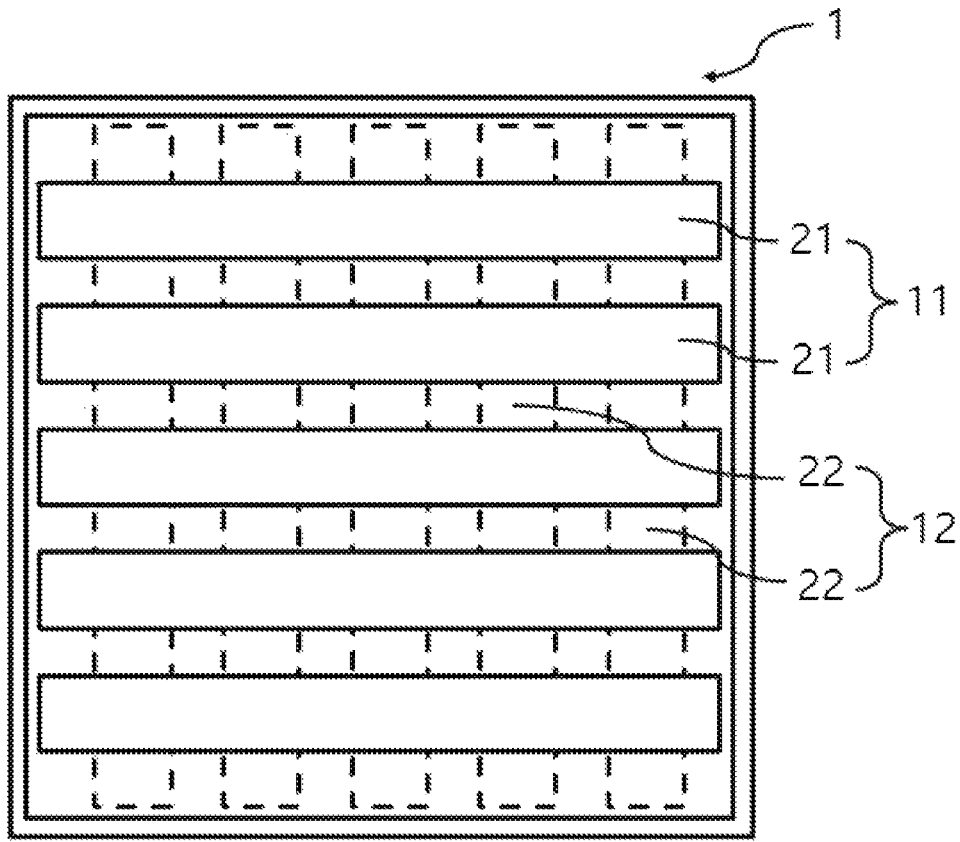
FIG. 2 is a plan view of the transparent electrode structure for a fingerprint sensor disclosed in Related Art 1.
Figure 3:
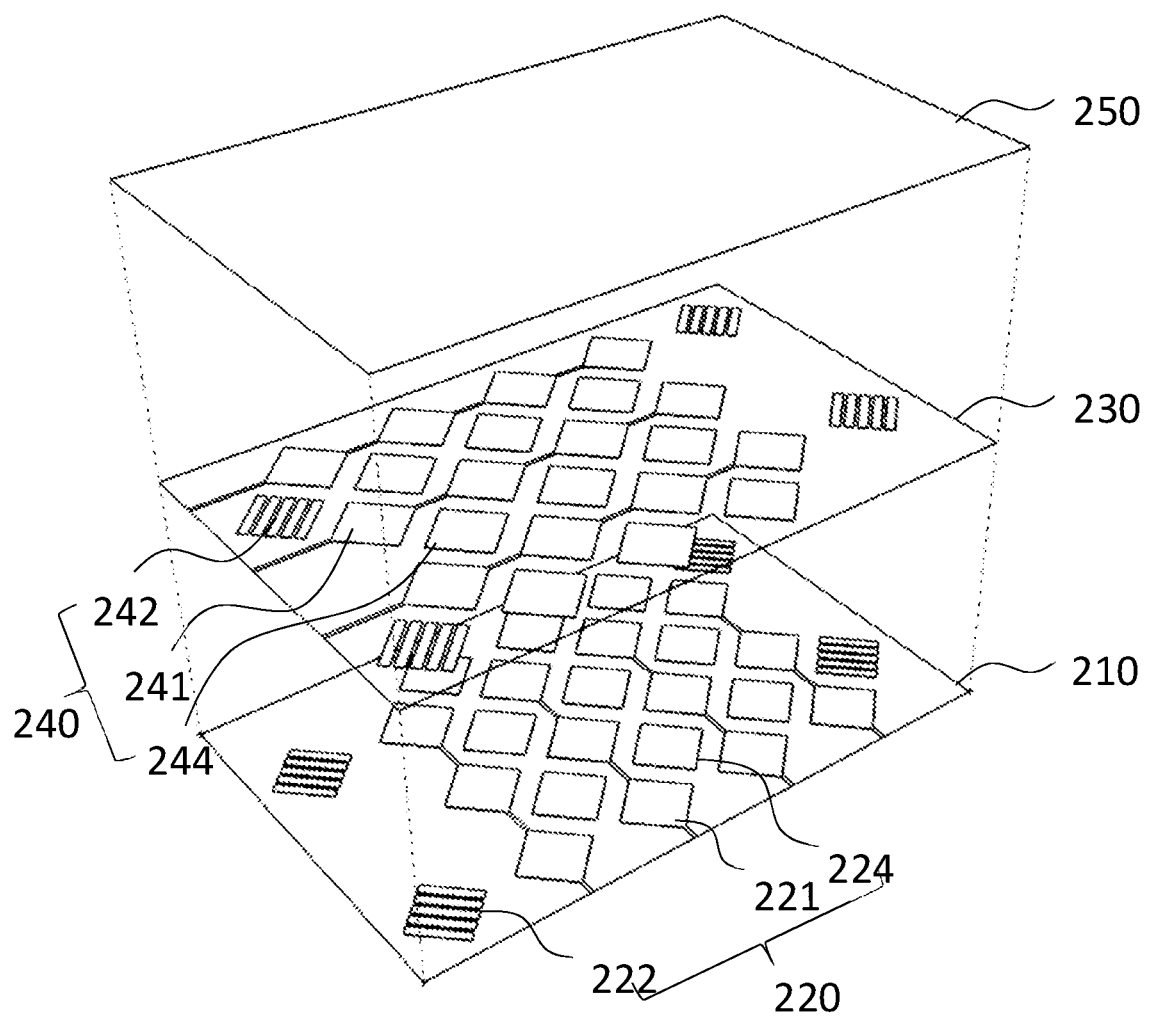
FIG. 3 is an exploded perspective view of a touch sensor with a fingerprint sensor according to a first embodiment of the present invention.

FIG. 3 illustrates an exploded state of a touch sensor with a fingerprint sensor according to a first embodiment of the present invention.

Respective components of the touch sensor with a fingerprint sensor according to the first embodiment of the present invention illustrated in FIG. 3 may not be manufactured in a manner of disassembling/assembling them from or to each other as illustrated in FIG. 3, and FIG. 3 is illustrated only to assist in the understanding.

As illustrated in FIG. 3, touch sensor with a fingerprint sensor according to the first embodiment of the present invention may include a base film 210, a lower electrode layer 220, a dielectric layer 230, an upper electrode layer 240, and a cover layer 250.

As illustrated in FIG. 3, the base film 210, the lower electrode layer 220, the dielectric layer 230, the upper electrode layer 240, and the cover layer 250 may be formed on one side.

The base film 210 illustrated in FIG. 3 is provided in order to form the lower electrode layer 220 positioned on one surface thereof. The base film 210 may be formed of a material having a light transmittance of a predetermined level or more, and may be formed of a material having an elasticity of a predetermined level or more. The base film 210 may be typically formed of a material including polyimide (PI).

As illustrated in FIG. 3, the lower electrode layer 220 is formed on one surface of the base film 210 and is formed in order to sense a touch input by a user and a user's fingerprint. Since the lower electrode layer 220 is formed on one surface of the base film 210, the base film 210 and the lower electrode layer 220 have been illustrated without being distinguished separately from each other.

As illustrated in FIG. 3, the lower electrode layer 220 may include first touch sensor electrodes 221, first fingerprint sensor electrodes 222, and first dummy electrodes 224, which will be described later. The lower electrode layer 220 may have a light transmittance of a predetermined level or more as a whole.

As illustrated in FIG. 3, the dielectric layer 230 formed on one surface of the lower electrode layer 220 is formed between the lower electrode layer 220 and the upper electrode layer 240 to electrically insulate the lower electrode layer 220 and the upper electrode layer 240 from each other. The dielectric layer 230 may be formed of a material having a light transmittance of a predetermined level or more, and may be formed of a material selectively passing light of a desired wavelength therethrough. For example, the dielectric layer 230 may include glass, quartz, silicon oxide, aluminum oxide, hafnium oxide, or a polymer.

As illustrated in FIG. 3, the upper electrode layer 240 may be formed on one surface of the dielectric layer 230. Since the upper electrode layer 240 is also formed on one surface of the dielectric layer 230, the dielectric layer 230 and the upper electrode layer 240 have been illustrated in a form in which they are integrated with each other without being distinguished from each other in FIG. 3. The upper electrode layer 240 may include second touch sensor electrodes 241, second fingerprint sensor electrodes 242, and second dummy electrodes 244, which will be described later. The upper electrode layer 240 may also have a light transmittance of a predetermined level or more.

As illustrated in FIG. 3, the cover layer 250 is formed on one surface of the upper electrode layer 240 to serve to protect the upper electrode layer 240. The cover layer 250 may also have a light transmittance of a predetermined level or more.

Figure 4:
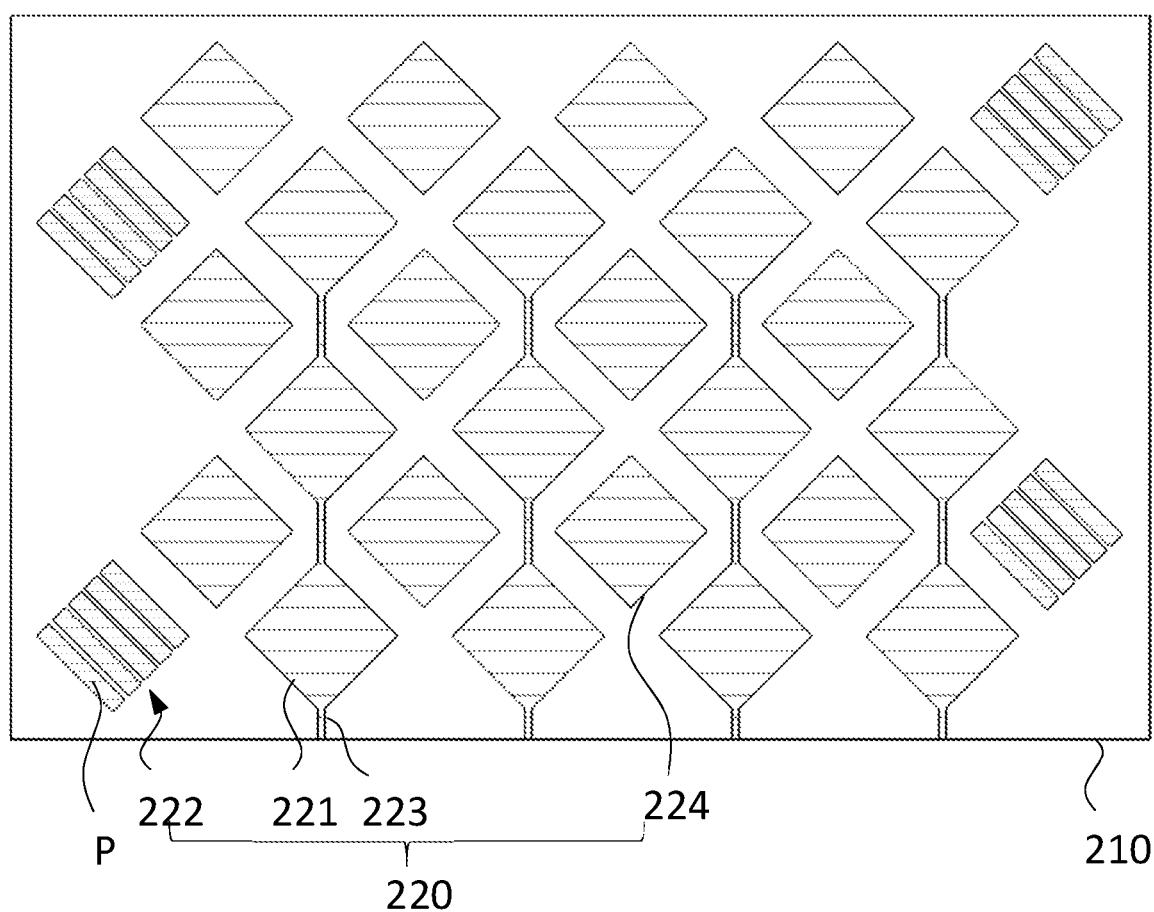
FIG. 4 is a plan view of a base film and a lower electrode layer of the touch sensor with a fingerprint sensor according to the first embodiment of the present invention.

FIG. 4 illustrates a state of the base film 210 and the lower electrode layer 220 integrated with each other when viewed from above.

As illustrated in FIG. 4, the first touch sensor electrodes 221 included in the lower electrode layer 220 are formed in order to sense a touch by the user in the touch sensor with a fingerprint sensor according to the present embodiment, and constitute the touch sensor. A plurality of first touch sensor electrodes 221 are arranged two-dimensionally on a surface of the base film 210. However, the plurality of first touch sensor electrodes 221 may be arranged to be spaced apart from each other in parallel with each other so that a predetermined space is secured between two first touch sensor electrodes 221 adjacent to each other. In this case, a width of the space between the two first touch sensor electrodes 221 adjacent to each other may be equal to or greater than a width of a single first touch sensor electrode.

In the present invention, one or more first fingerprint sensor electrodes 222 may be formed on the surface of the base film 210. In the present embodiment illustrated in FIG. 4, a total of four first fingerprint sensor electrodes 222 are formed on the surface of the base film 210. The first fingerprint sensor electrodes 222 may be disposed outside the first touch sensor electrodes 221 disposed on the surface of the base film 210. The reason is that it is advantageous to form the first fingerprint sensor electrodes 222 outside the first touch sensor electrodes 221 because conductive lines connecting the first fingerprint sensor electrodes 222 to the outside should be formed in order to transmit signals detected by the first fingerprint sensor electrode 222 to the outside. However, the present invention does not limit positions of the first fingerprint sensor electrodes 222 to an outer side of the base film 210 as illustrated in FIG. 4, and the first fingerprint sensor electrodes 222 may be disposed at positions spaced apart from the outer side of the base film 210 inward by one or more first touch sensor electrode 221 unlike FIG. 4.

As illustrated in FIG. 4, a single first fingerprint sensor electrode 222 includes a plurality of patterns P formed to be spaced apart from each other in parallel with each other. In this case, an interval between two patterns P disposed adjacent to each other among the plurality of patterns P constituting the single first fingerprint sensor electrode 222 may be 0.1 to 30 μm, and a width of a single pattern P may be 0.1 to 100 μm. A fine width of the pattern and a fine interval between the patterns may be a criterion for distinguishing the touch sensor electrode and the fingerprint sensor electrode from each other. The reason why a difference occurs between the touch sensor electrode and the fingerprint sensor electrode in this manner is that uses of the touch sensor and the fingerprint sensor constituted by the respective electrodes are different from each other.

The plurality of patterns P constituting the first fingerprint sensor electrode 222 illustrated in FIG. 4 are formed to extend in a left upper diagonal direction on the basis of FIG. 4, and are formed to be spaced apart from each other in a direction perpendicular to the left upper diagonal direction, and the left upper diagonal direction is referred to as a first direction. A direction in which a second fingerprint sensor electrode to be described later extends is referred to as a second direction.

As illustrated in FIG. 4, the plurality of first touch sensor electrodes 221 arranged two-dimensionally are connected to each other by a first conductive line 223 formed to extend in a vertical direction. Here, the vertical direction is a third direction, and the plurality of first touch sensor electrodes 221 are electrically connected by the first conductive line 223 to form one column.

As illustrated in FIG. 4, the first dummy electrodes 224 are disposed in spaces between the first touch sensor electrodes 221 adjacent to each other or spaces adjacent to the first touch sensor electrodes 221. The first dummy electrodes 224 are positioned to face the second touch sensor electrodes 241 included in the upper electrode layer 240 when all of the base film 210, the lower electrode layer 220, the dielectric layer 230, and the upper electrode layer 240 are stacked. However, the first dummy electrodes 224 are not electrically connected to each other by the first conductive line 223, and are electrodes used in order to make a light transmittance uniform as a whole in touch sensors according to various embodiment of the present invention.

Figure 5:
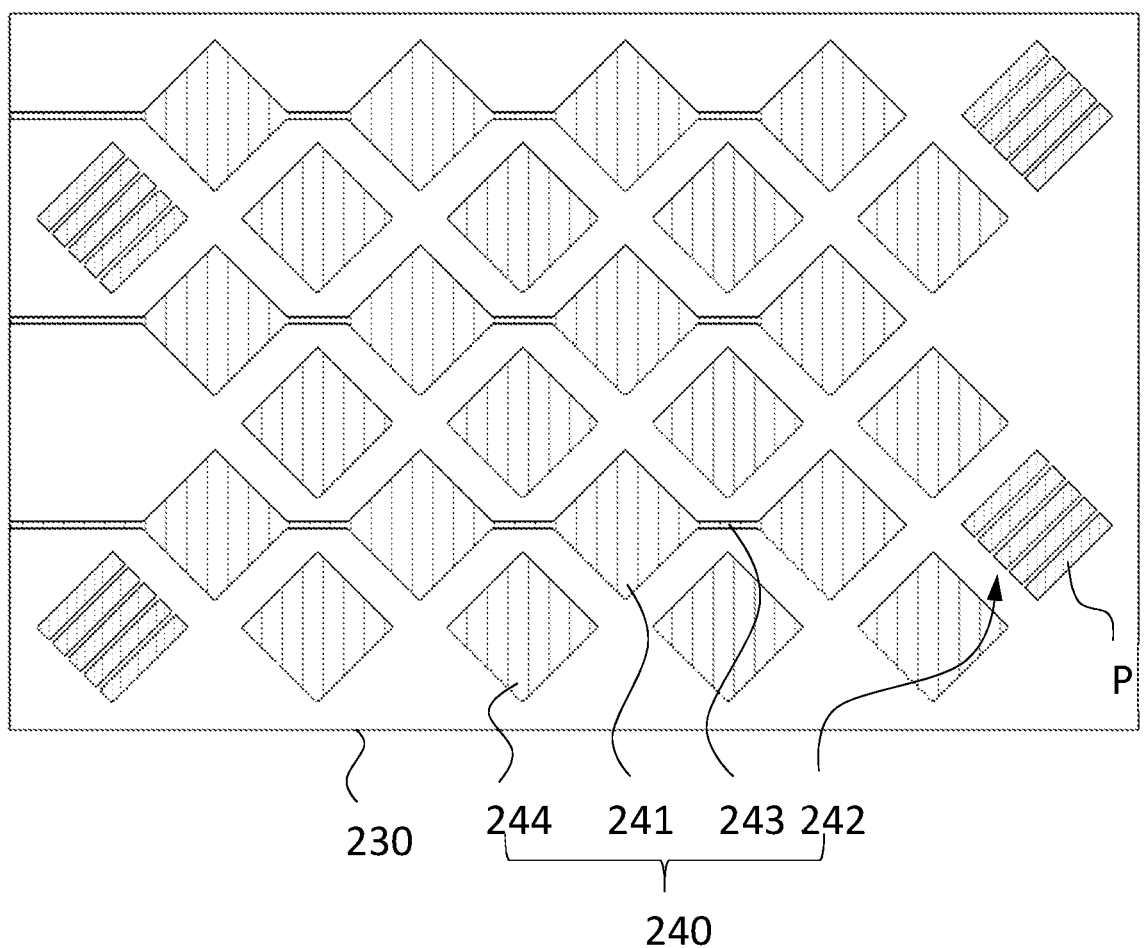
FIG. 5 is a plan view of a dielectric layer and an upper electrode layer of the touch sensor with a fingerprint sensor according to the first embodiment of the present invention.

FIG. 5 illustrates a state of the dielectric layer 230 and the upper electrode layer 240 integrated with each other when viewed from above. A plurality of second touch sensor electrodes 241 included in the upper electrode layer 240 are disposed to be spaced apart from each other by a predetermined interval, similar to the first touch sensor electrodes 221, and a width between second touch sensor electrodes 241 adjacent to each other is equal to or greater than a width of a single second touch sensor electrode 241. The second touch sensor electrodes 241 are electrically connected to each other in a horizontal direction using a second conductive line 243, and the second touch sensor electrodes electrically connected to each other may form one row. The horizontal direction in which the second conductive line 243 is formed is referred to as a fourth direction. The third direction and the fourth direction may intersect with each other at a predetermined angle.

As illustrated in FIG. 5, the second dummy electrodes 244 are disposed in spaces between the second touch sensor electrodes 241 adjacent to each other or spaces adjacent to the second touch sensor electrodes 241. The second dummy electrodes 244 are positioned to face the first touch sensor electrodes 221 included in the lower electrode layer 220 when all of the base film 210, the lower electrode layer 220, the dielectric layer 230, and the upper electrode layer 240 are stacked. However, the second dummy electrodes 244 are not electrically connected to each other by the second conductive line 243, and are electrodes used in order to make a light transmittance uniform as a whole in the touch sensors according to various embodiments of the present invention.

The second fingerprint sensor electrode 242 is disposed at the same position as the first fingerprint sensor electrode 222 on the basis of the direction in which the respective layers are stacked, so as to face the first fingerprint sensor electrode 222 described above, and constitute the fingerprint sensor together with the first fingerprint sensor electrode 222. A single pattern included in the second fingerprint sensor electrode 242 is formed in a right upper diagonal direction, which is the second direction, and a plurality of patterns are disposed to be spaced apart from each other by a predetermined interval in a direction perpendicular to a direction in which the patterns extend. It has been illustrated that the first direction, which is a pattern direction of the first fingerprint sensor electrode 222, and the second direction, which is a pattern direction of the second fingerprint sensor electrode 242, in the present invention intersect with each other to be perpendicular to each other, but the present invention is not limited thereto, and the first direction and the second direction may be set to intersect with each other at a predetermined angle. A width of the pattern included in the second fingerprint sensor electrode 242 may also be 0.1 to 100 µm as in the first fingerprint sensor electrode 222, and an interval between adjacent patterns included in the second fingerprint sensor electrode 242 may be 0.1 to 30 µm.

Light transmittances of all of the first touch sensor electrode 221, the second touch sensor electrode 241, the first fingerprint sensor electrode 222, the second fingerprint sensor electrode 242, the first dummy electrode 224, and the second dummy electrode 244 described above may be the same as each other or similar to each other within a predetermined range. In addition, entire shapes of the respective electrodes and areas occupied by the respective electrodes may be the same as each other.

Figure 6:
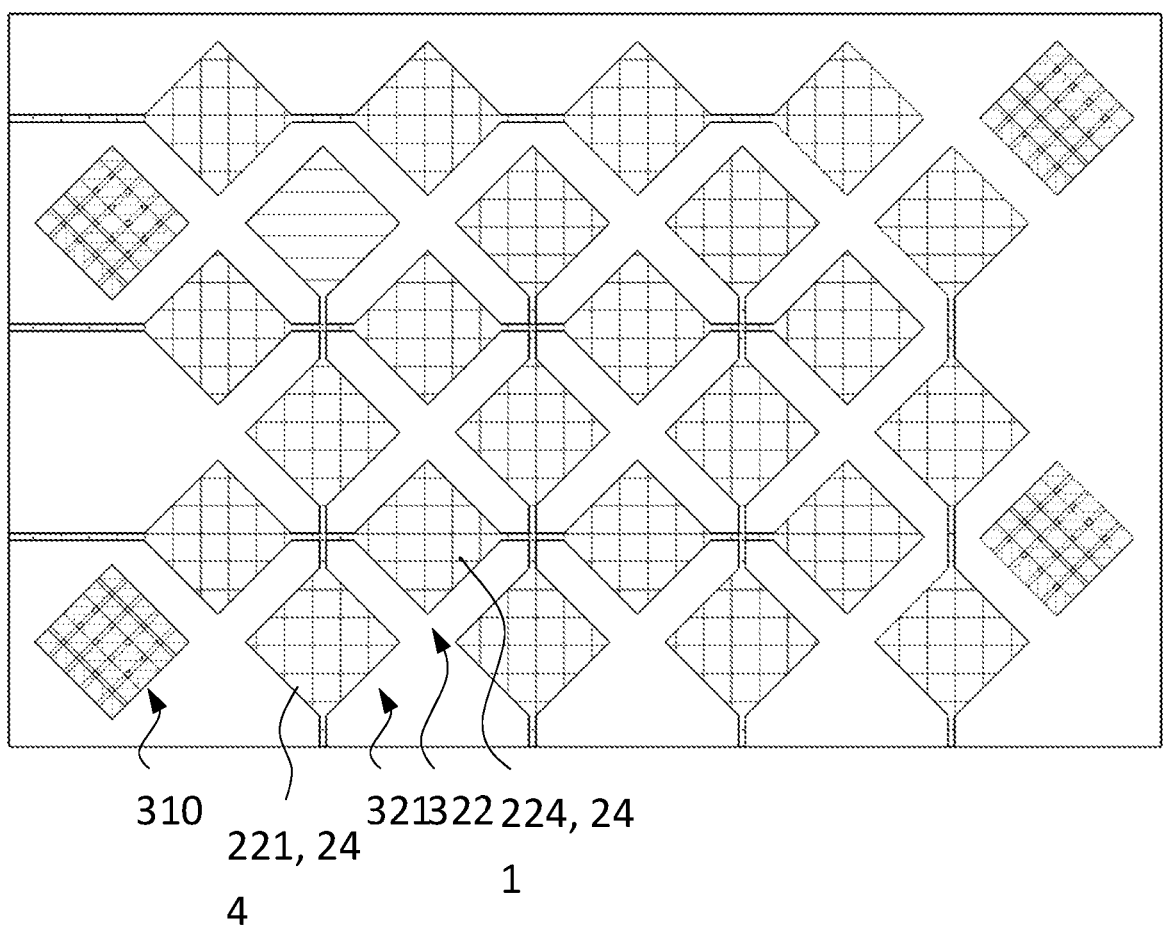
FIG. 6 is a plan view of the touch sensor with a fingerprint sensor according to the first embodiment of the present invention in a state in which a cover layer is excluded.

FIG. 6 illustrates a state after the base film 210, the lower electrode layer 220, the dielectric layer 230, and the upper electrode layer 240 illustrated in FIGS. 4 and 5 are integrated with each other, when viewed from above.

As illustrated in FIG. 6, the first fingerprint sensor electrode 222 and the second fingerprint sensor electrode 242 constitute a fingerprint sensor 310 by overlapping each other at the same position so as to face each other, and the first touch sensor electrode 221 and the second dummy electrode 244 constitute a first touch sensor 321, and the second touch sensor electrode 241 and the first dummy electrode 224 constitute a second touch sensor 322. Since all of the fingerprint sensor 310, the first touch sensor 321, and the second touch sensor 322 are constituted by two electrodes overlapping each other, light transmittances of the respective sensors are the same as each other or similar to each other within a predetermined range, and the touch sensor according to the present embodiment has a light transmittance uniform as a whole or similar within a predetermined range. Therefore, when the present embodiment is applied to one side of a light emitting layer, a display device may provide an output of uniform brightness as a whole.

The lower electrode layer 220 and the upper electrode layer 240 according to the present invention may be formed by forming layers on one surface of the base film 210 and one surface of the dielectric layer 230, respectively, using a transparent electrode material, and then patterning the layers by various methods to form electrodes included in the respective electrode layers. In this case, the transparent electrode material may include one or more of a metal nanowire, a metal nanofiber, a metal mesh, and a metal oxide, and in particular, the transparent electrode material may essentially include one or more of a metal nanowire and a metal nanofiber. As a method of forming the layers using the transparent electrode material, there may be methods such as vacuum deposition, spraying, spin coating, and deposition printing, and as a method of forming the electrodes included in the respective electrode layers, there may be methods such as a photoresist (PR) process, laser patterning, E-beam patterning, and transfer printing. However, the present invention does not limit a method of forming the lower electrode layer 220 and the upper electrode layer 240 to the methods described above, and the lower electrode layer 220 and the upper electrode layer 240 may also be formed on one surface of the base film 210 and one surface of the dielectric layer 230, respectively, by methods other than the methods described above.

Second Embodiment

Hereinafter, a touch display device to which a touch sensor with a fingerprint sensor according to a second embodiment of the present invention is applied will be described in detail with reference to the accompanying drawings.

In the touch sensor according to the first embodiment of the present invention described above, the light transmittance has made uniform by including the first dummy electrodes and the second dummy electrodes in the lower electrode layer and the upper electrode layer, respectively. However, in a touch display device to which a touch sensor with a fingerprint sensor according to a second embodiment of the present invention to be described below is applied, brightness of the touch display device is made uniform by controlling local brightness of a light emitting layer by a separate control unit without using the dummy electrodes. The touch display device to which the touch sensor with a fingerprint sensor according to a second embodiment of the present invention is applied may include a light emitting layer, a base film, a lower electrode layer, a dielectric layer, an upper electrode layer, and a control unit. Here, the base film and the dielectric layer according to the present embodiment are the same as those of the touch sensor according to the first embodiment of the present invention and the lower electrode layer and the upper electrode layer are the same as those of the touch sensor according to the first embodiment of the present invention except that they do not include the dummy electrodes, and a detailed description therefor will thus be omitted.

Figure 7:
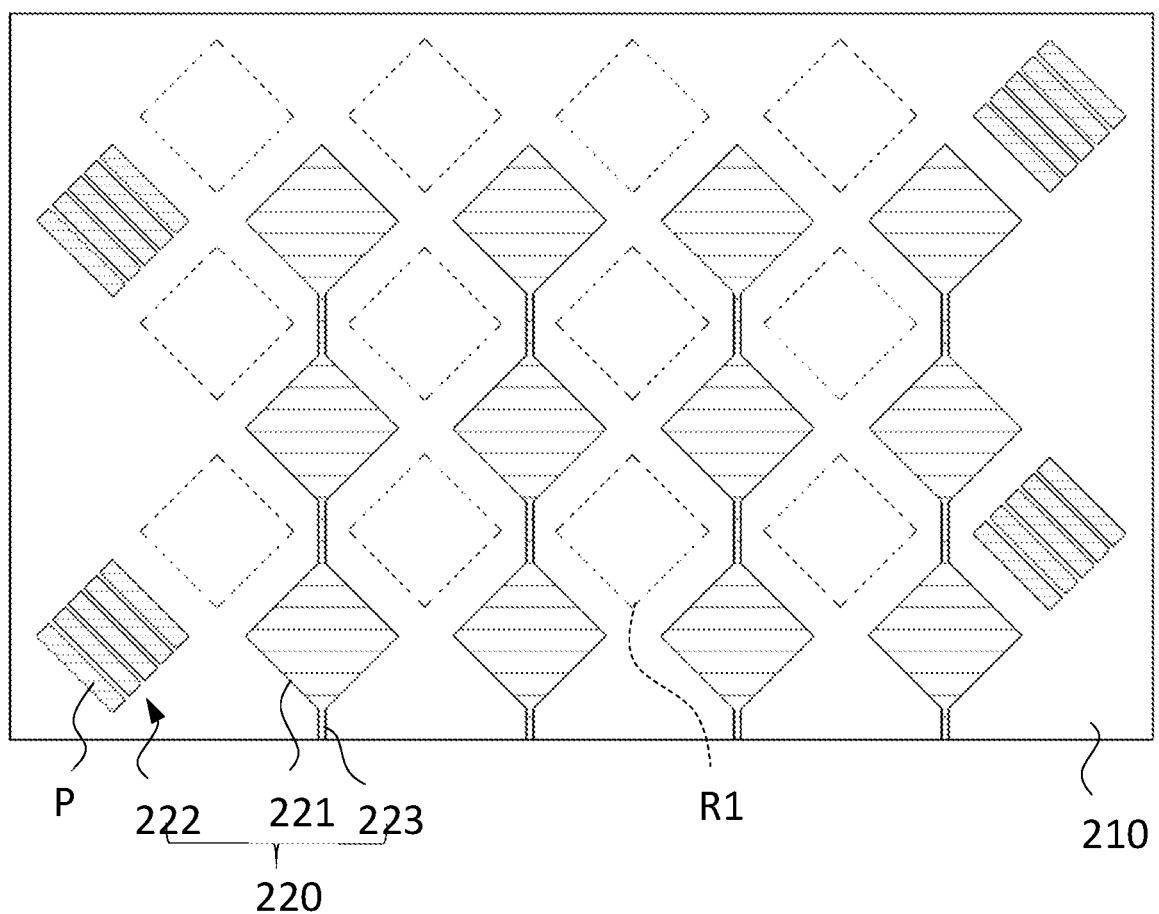
FIG. 7 is a plan view of a base film and a lower electrode layer of a touch sensor with a fingerprint sensor according to a second embodiment of the present invention.

FIG. 7 illustrates a state of a base film 210 and a lower electrode layer 220 of the touch sensor according to the second embodiment of the present invention, when viewed from above.

As illustrated in FIG. 7, the lower electrode layer 220 does not include the first dummy electrodes, and portions where the first dummy electrodes are positioned in the first embodiment are replaced with first candidate regions R1. The first candidate regions R1 are portions facing the second touch sensor electrodes 241 when all of the base film 210, the lower electrode layer 220, the dielectric layer 230, and the upper electrode layer 240 are stacked.

Figure 8:
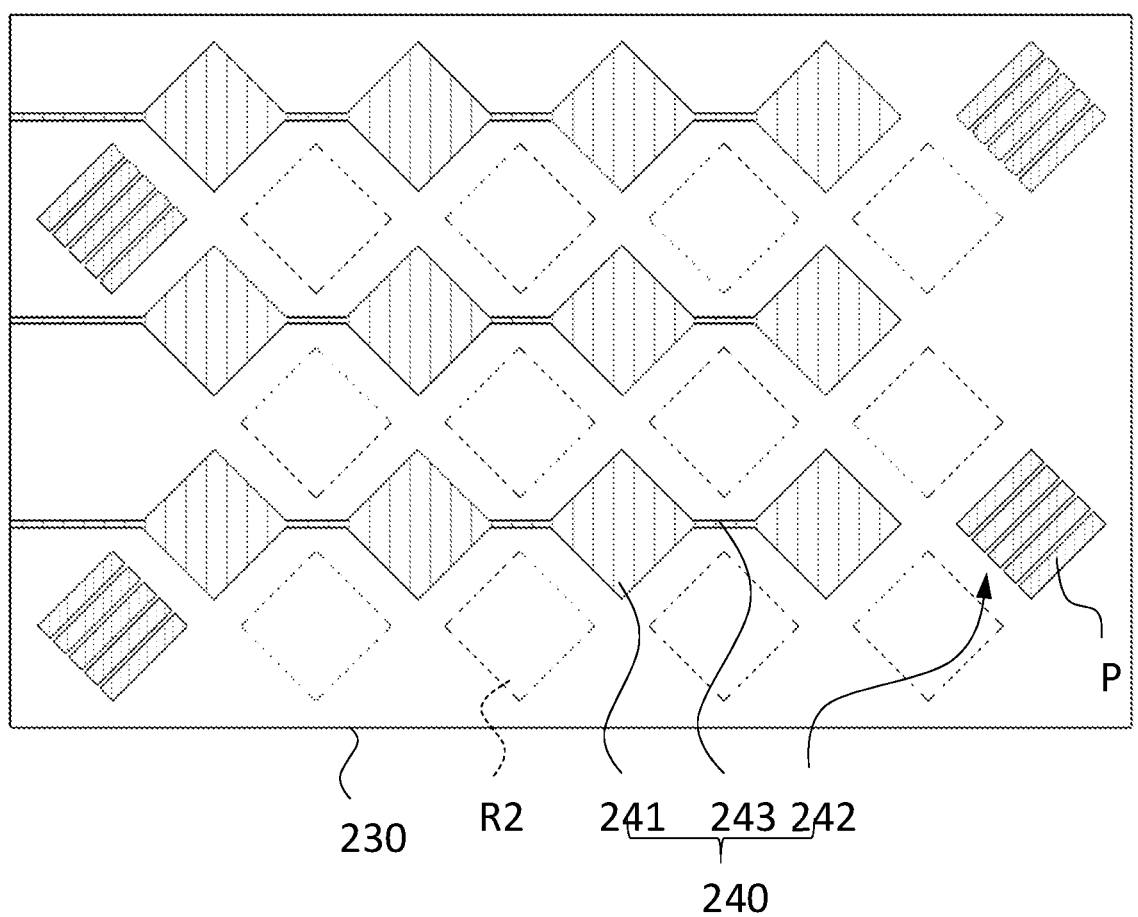
FIG. 8 is a plan view of a dielectric layer and an upper electrode layer of the touch sensor with a fingerprint sensor according to the second embodiment of the present invention.

FIG. 8 illustrates a state of a dielectric layer 230 and an upper electrode layer 240 of the touch sensor according to the second embodiment of the present invention, when viewed from above.

As illustrated in FIG. 8, the upper electrode layer 240 does not include the second dummy electrodes, and portions where the second dummy electrodes are positioned in the first embodiment are replaced with second candidate regions R2. The second candidate regions R2 are portions facing the first touch sensor electrodes 221 when all of the base film 210, the lower electrode layer 220, the dielectric layer 230, and the upper electrode layer 240 are stacked.

Figure 9:
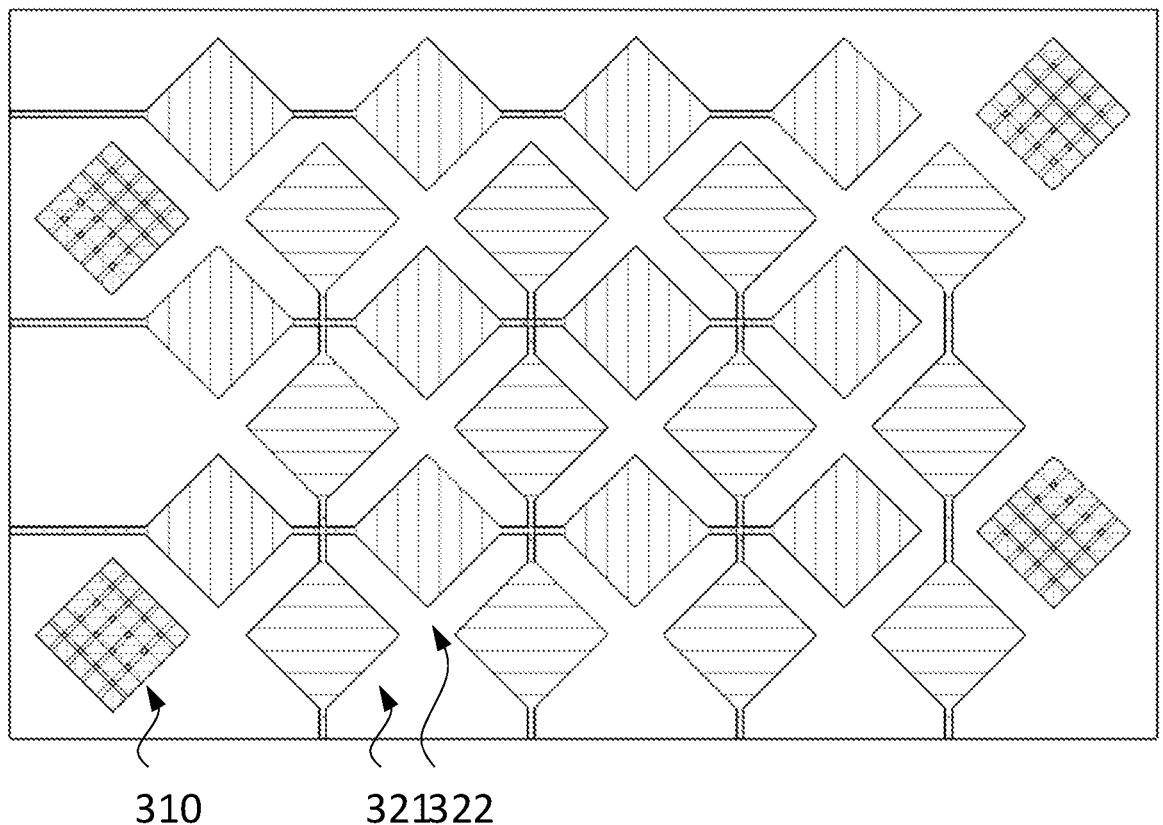
FIG. 9 is a plan view of the touch sensor with a fingerprint sensor according to the second embodiment of the present invention in a state in which a cover layer is excluded.

FIG. 9 illustrates a state after the base film 210, the lower electrode layer 220, the dielectric layer 230, and the upper electrode layer 240 illustrated in FIGS. 7 and 8 are integrated with each other, when viewed from above. The fingerprint sensor 310 is constituted by the first fingerprint sensor electrode 222 and the second fingerprint sensor electrode 242 overlapping each other, and a light transmittance of the fingerprint sensor 310 may thus be lower than that of each of the first touch sensor 321 and the second touch sensor 322 constituted by one electrode.

Figure 10:
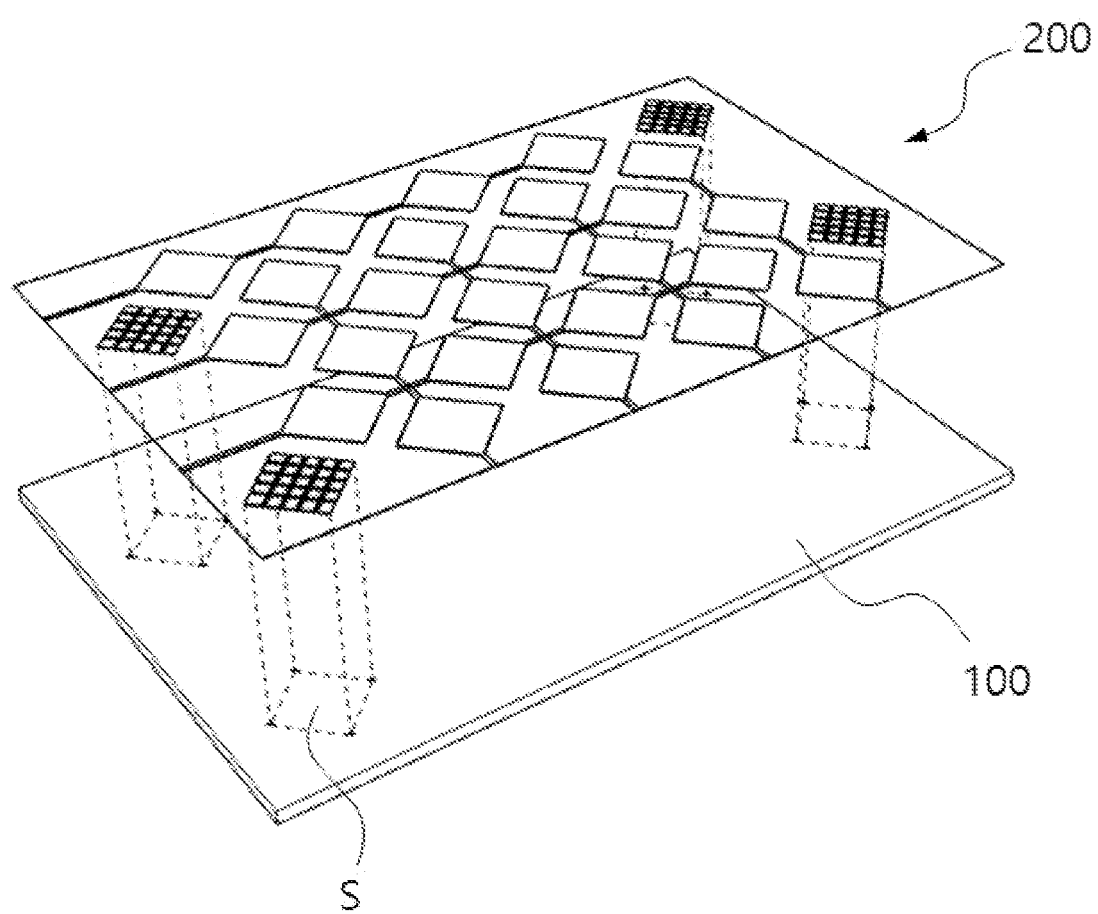
FIG. 10 is an exploded perspective view of a touch display device to which a touch sensor with a fingerprint sensor according to the second embodiment of the present invention is applied.

FIG. 10 illustrates an exploded state of the touch display device to which the touch sensor according to the second embodiment of the present invention is applied, and the touch display device may include a light emitting layer 100 and the touch sensor 200 according to the second embodiment of the present invention.

The touch display device to which the touch sensor according to the second embodiment of the present invention is applied may include a control unit that may control local brightness of the light emitting layer 100. The control unit may control a separate control region S, which is a portion where the fingerprint sensor 310 is positioned, in an entire region of the light emitting layer 100 to be brighter than the rest portion where the first touch sensor 321 and the second touch sensor 322 are disposed, on the basis of a direction in which the light emitting layer 100 and the touch sensor 200 are stacked, to compensate for mura of the touch display device that may occur due to application of the fingerprint sensor 310, thereby making an output of the touch display device uniform. The control unit may control an output of the light emitting layer in the separate control region S to be greater than an output of the light emitting layer in a region in which the first touch sensor 321 or the second touch sensor 322 is disposed with respect to the same display request signal.

The touch display device to which the touch sensor according to the second embodiment of the present invention is applied may further include a storage unit (not illustrated). The storage unit may be implemented by hardware such as a kind of memory. Light transmittances of each of the first touch sensor 321, the second touch sensor 322, and the fingerprint sensor 310 may be stored in the storage unit. The control unit may control brightness of the touch display device to be uniform as a whole by locally controlling brightness of the light emitting layer using light transmittance information stored in the storage unit.

With the touch sensor with a fingerprint sensor according to the present invention as described above, the light transmittances of the touch sensor and the fingerprint sensor may be made the same as each other or similar to each other within a predetermined range using the dummy electrodes, thereby making an output of the touch display device uniform so that there is no difference (mura) in brightness that may occur in the touch display device to which the fingerprint sensor and the touch sensor are applied together.

In addition, according to the present invention, even though the dummy electrodes are not used, the control unit may control outputs of a portion to which the touch sensor is applied and the rest portion on a surface of the light emitting layer to be different from each other, thereby making an output of the touch display device uniform so that there is no difference (mura) in brightness that may occur in the touch display device to which the fingerprint sensor and the touch sensor are applied together.

The present invention should not be construed to being limited to the embodiments described above. The present invention may be applied to various fields and may be variously modified by those skilled in the art without departing from the scope of the present invention claimed in the claims. Therefore, it is obvious to those skilled in the art that these alterations and modifications fall in the scope of the present invention.

DETAILED DESCRIPTION OF MAIN ELEMENTS

1: transparent electrode structure for fingerprint sensor
11: first electrode
12: second electrode
13: dielectric layer
14: cover
100: light emitting layer
200: touch sensor
210: base film
220: lower electrode layer
221: first touch sensor electrode
222: first fingerprint sensor electrode
223: first conductive line
224: first dummy electrode
230: dielectric layer
240: upper electrode layer
241: second touch sensor electrode
242: second fingerprint sensor electrode
243: second conductive line
244: second dummy electrode
310: fingerprint sensor
321: first touch sensor
322: second touch sensor
R1: first candidate region
R2: second candidate region

What is claimed is:

1. A touch sensor with a fingerprint sensor, comprising:
a lower electrode layer including a plurality of first touch sensor electrodes arranged two-dimensionally, first dummy electrodes, and one or more first fingerprint sensor electrodes; and
an upper electrode layer formed on one side of the lower electrode layer and including a plurality of second touch sensor electrodes arranged two-dimensionally, second dummy electrodes, and one or more second fingerprint sensor electrodes,
wherein the first fingerprint sensor electrode and the second fingerprint sensor electrode are arranged at the same position so as to face each other to constitute the fingerprint sensor, and
the first touch sensor electrode and the second dummy electrode are arranged at the same position so as to face each other, and the second touch sensor electrode and the first dummy electrode are arranged at the same position so as to face each other,
wherein the fingerprint sensor is disposed at a vertex of an outer side of a touch display device,
wherein the fingerprint sensor is disposed to be spaced apart from an outer side of a touch display device inward by one or more first touch sensor electrodes or second touch sensor electrodes, wherein light transmittances of a first touch sensor constituted by the first touch sensor electrode and the second dummy electrode, a second touch sensor constituted by the second touch sensor electrode and the first dummy electrode, and the fingerprint sensor are the same as each other.

2. The touch sensor with a fingerprint sensor of claim 1, wherein the first fingerprint sensor electrode includes a plurality of patterns formed to be spaced apart from each other in a first direction, and the second fingerprint sensor electrode includes a plurality of patterns formed to be spaced apart from each other in a second direction intersecting with the first direction at a predetermined angle.

3. The touch sensor with a fingerprint sensor of claim 2, wherein an interval between the patterns adjacent to each other is 0.1 to 30 μm.

4. The touch sensor with a fingerprint sensor of claim 2, wherein a width of the pattern is 0.1 to 100 μm.

5. The touch sensor with a fingerprint sensor of claim 1, wherein a first touch sensor constituted by the first touch sensor electrode and the second dummy electrode, a second touch sensor constituted by the second touch sensor electrode and the first dummy electrode, and the fingerprint sensor have the same shape.

6. The touch sensor with a fingerprint sensor of claim 1, wherein the first touch sensor electrodes and the first dummy electrodes are alternately arranged.

7. The touch sensor with a fingerprint sensor of claim 1, wherein the second touch sensor electrodes and the second dummy electrodes are alternately arranged.

8. The touch sensor with a fingerprint sensor of claim 1, wherein the lower electrode layer includes a first conductive line connecting between the first touch sensor electrodes adjacent to each other in a third direction, and the upper electrode layer includes a second conductive line connecting between the second touch sensor electrodes adjacent to each other in a fourth direction in a direction intersecting with the third direction.

9. The touch sensor with a fingerprint sensor of claim 1, further comprising:

a base film formed on the other surface of the lower electrode layer; and a cover layer formed on one surface of the upper electrode layer.

* * * * *